(12) United States Patent
Majer et al.

(10) Patent No.: US 10,690,100 B2
(45) Date of Patent: Jun. 23, 2020

(54) DEVICE FOR MEASURING THE INJECTION RATE, METHOD FOR PRODUCING A DEVICE OF SAID TYPE, AND MEASURING METHOD

(71) Applicant: Robert Bosch GmbH, Stuttgart (DE)

(72) Inventors: Clemens Majer, Ingersheim (DE); Iris Hartung, Schorndorf (DE); Thomas Fischer, Stuttgart (DE); Wolfgang Sander, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 15/575,938

(22) PCT Filed: Mar. 22, 2016

(86) PCT No.: PCT/EP2016/056191
§ 371 (c)(1),
(2) Date: Nov. 21, 2017

(87) PCT Pub. No.: WO2016/188647
PCT Pub. Date: Dec. 1, 2016

(65) Prior Publication Data
US 2018/0142658 A1 May 24, 2018

(30) Foreign Application Priority Data

May 22, 2015 (DE) .................. 10 2015 209 398

(51) Int. Cl.
*G01F 1/50* (2006.01)
*F02M 65/00* (2006.01)
(Continued)

(52) U.S. Cl.
CPC ............ *F02M 65/001* (2013.01); *G01F 1/50* (2013.01); *G01M 15/08* (2013.01); *F02M 61/04* (2013.01);
(Continued)

(58) Field of Classification Search
CPC ....................................................... G01F 1/50
See application file for complete search history.

(56) References Cited

U.S. PATENT DOCUMENTS

2006/0156801 A1 7/2006 Kuhn
2012/0118059 A1* 5/2012 Reimer ................. F01N 3/2066
73/290 V

FOREIGN PATENT DOCUMENTS

CN 101761436 A 6/2010
DE 10249754 5/2004
(Continued)

OTHER PUBLICATIONS

International Search Report for Application No. PCT/EP2016/056191 dated Jun. 7, 2016 (English Translation, 2 pages).

*Primary Examiner* — Lisa M Caputo
*Assistant Examiner* — Alex T Devito
(74) *Attorney, Agent, or Firm* — Michael Best & Friedrich LLP

(57) ABSTRACT

A device (1) for measuring the injection rate dm(t)/dt of an injection valve (2) for a fluid (4a), wherein m(t) is the injection quantity of the fluid (4a) as a function of the time (t), having a measurement volume (3) which is closed off on all sides and which is filled with a test fluid (4), having an opening (5a) in one wall (5) of the measurement volume (3) for the purposes of receiving the injection valve (2) such that the injection valve (2), in the installed position, projects with at least one injection opening (2a) into the measurement volume (3), and having a pressure sensor (6) which is arranged in the measurement volume (3), wherein correction means (8, 8a, 9a, 9b, 9c) are provided for determining the propagation time of a pressure wave (12), which originates from the injection opening (2a) and which propagates through the test fluid (4), to the pressure sensor (6) and for correcting the measured injection rate dm(t)/dt, taking said (Continued)

propagation time into consideration, to give a rectified injection rate dm'(t)/dt. A method for producing the device (1), wherein the characteristic map (8a) is determined by way of a fluid-dynamic simulation of the time-dependent and position-dependent local speed of sound c(t,x) in a partial volume of the measurement volume (3) which encompasses at least the path (11) from the injection opening (2a) to the pressure sensor (6), which simulation is based on at least one time-dependent boundary condition for the pressure (p) in the measurement volume (3) and/or for the injection quantity (dm). A method for measuring the injection rate dm(t)/dt of an injection valve (2) for a fluid (4a).

11 Claims, 4 Drawing Sheets

(51) Int. Cl.
  *G01M 15/08* (2006.01)
  *F02M 61/04* (2006.01)
(52) U.S. Cl.
  CPC . *F02M 2200/247* (2013.01); *F02M 2200/248* (2013.01)

(56) References Cited

FOREIGN PATENT DOCUMENTS

| | | |
|---|---|---|
| DE | 102005056153 | 5/2007 |
| DE | 102008040628 | 1/2010 |
| JP | S6466450 A | 3/1989 |
| JP | 3077775 | 8/2000 |
| JP | 2000249691 A | 9/2000 |
| JP | 2001123917 A | 5/2001 |
| JP | 2014224466 | 12/2014 |

* cited by examiner

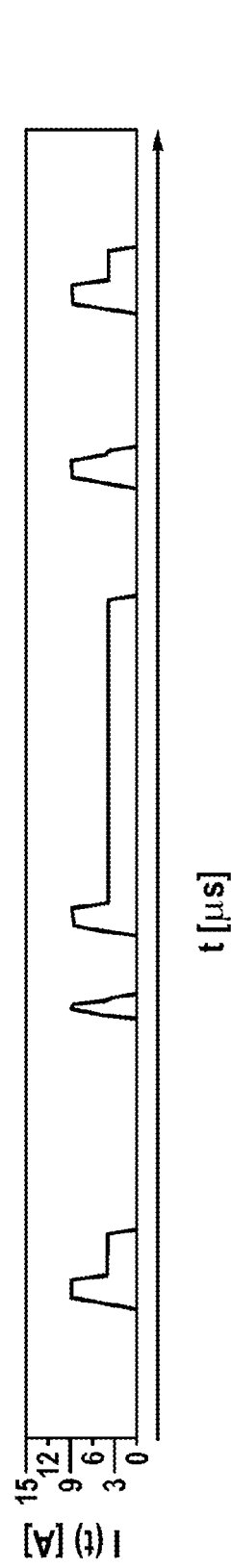
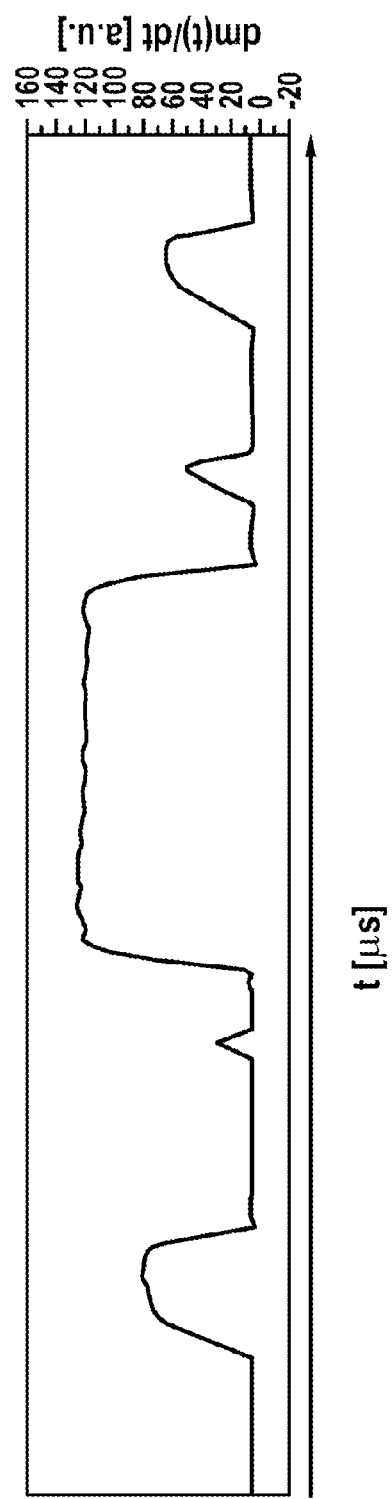
Fig. 2a
Fig. 2b

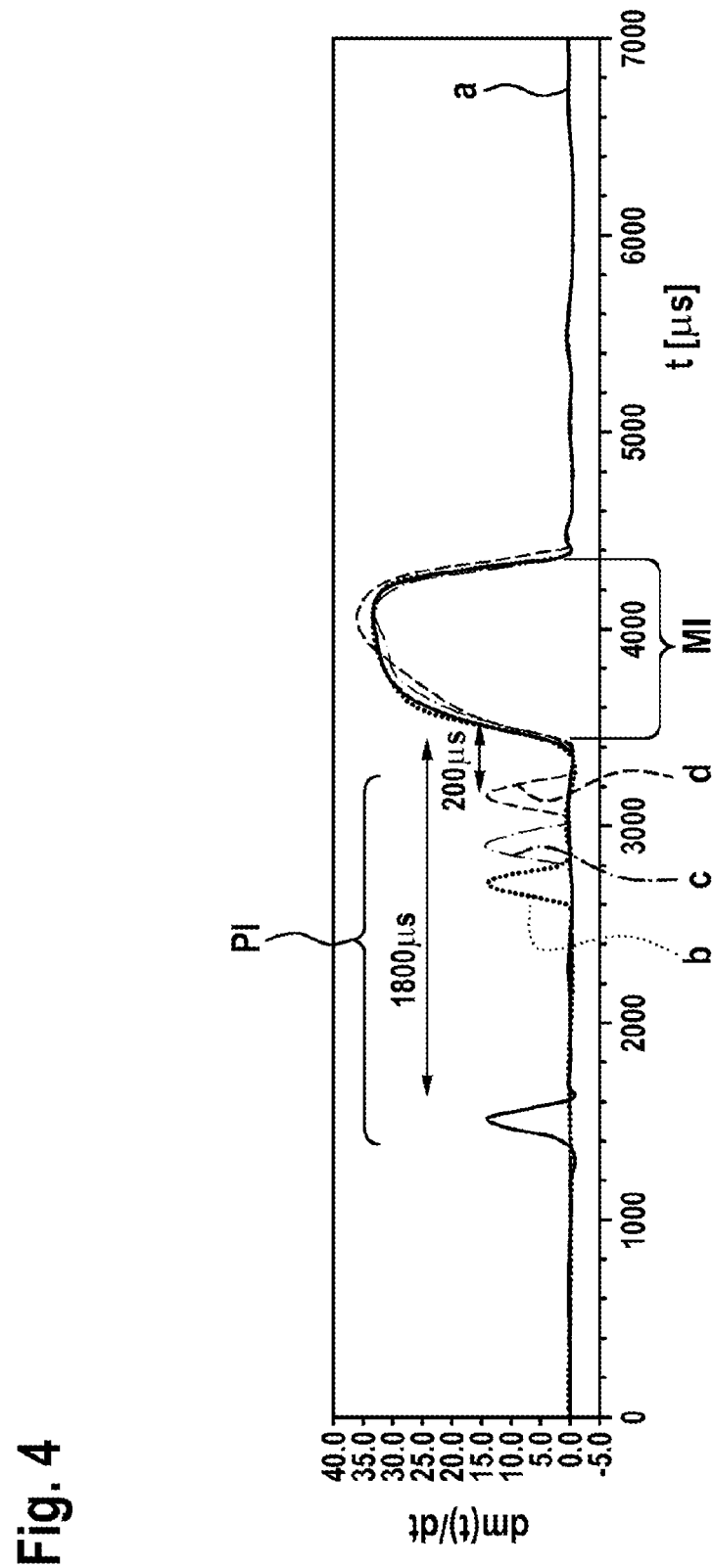

DEVICE FOR MEASURING THE INJECTION RATE, METHOD FOR PRODUCING A DEVICE OF SAID TYPE, AND MEASURING METHOD

BACKGROUND OF THE INVENTION

The invention relates to the functional testing and quality control of injection valves, in particular for vehicle fuels.

The consumption characteristics and environmental characteristics of diesel engines can be substantially improved if the fuel is injected into the combustion chamber according to a precise time program. In particular, it is desirable to inject multiple portions of fuel in rapid succession one after the other.

In order to be able to precisely control the time program, it is desirable to know the temporal progression of the transfer function with which the injection valve (injector) converts an electrical actuation into a mass flow of fuel. In particular, the time delay between the start of the electrical actuation (electrical start of injection) and the start of the mass flow (hydraulic start of injection) is of interest.

Hydraulic pressure increase analyzers have proven particularly reliable for measurements of this type. Examples for such apparatuses are disclosed in DE 10 249 754 A1 and in DE 10 2005 056 153 A1. A testing fluid is injected under pressure by means of the characterizing injection valve into a measuring volume which is enclosed and likewise filled with testing fluid. As a consequence, the pressure in the measuring volume increases and said pressure is registered by means of a sensor. The injected mass is derived directly from the temporal pressure curve and the time derivative provides the injection rate as a mass flow. It is possible as a result of this to read in particular the start of the hydraulic injection.

SUMMARY OF THE INVENTION

The object of the present invention is to further develop the known hydraulic pressure increase analyzers. This object is achieved in accordance with the invention by means of a device in accordance with the main claim, by means of a method for producing such a device in accordance with the coordinate claim, and also by means of a measuring method in accordance with the further coordinate claim. Further advantageous embodiments are evident in the dependent claims.

Within the scope of the invention, a device for measuring the injection rate $dm(t)/dt$ of an injection valve for a fluid is developed. $m(t)$ is the injection quantity of this fluid, said quantity being dependent upon the time t. The device comprises a measuring volume which is enclosed on all sides and is filled with a testing fluid. An opening for receiving the injection valve is provided in a wall of the measuring volume with the result that in the installed position the injection valve protrudes into the measuring volume with at least one injection opening. A pressure sensor is arranged in the measuring volume.

The fluid can be a liquid or a gas. The testing fluid can likewise be a liquid or a gas. Said testing fluid can be different than the fluid which the injection valve is designed to inject but in an advantageous embodiment of the invention said fluid can also be identical to this fluid.

In accordance with the invention, correcting means are provided for determining the propagation time of a pressure wave which starts at the injection opening and propagates through the testing fluid to the pressure sensor and also to correct the measured injection rate $dm(t)/dt$ to an adjusted injection rate $dm'(t)/dt$ taking into account this propagation time.

Just taking into account an average, constant propagation time and also advantageously correcting filter effects of a low pass filter which is possibly present and which denoises the measured values which are provided by the pressure sensor reduces, a systematic offset of the measured, time-dependent injection rate $dm(t)/dt$ along the time axis. Moreover, the inventors have identified that the propagation time is not constant. Said propagation time is determined by means of the local speed of sound in the testing fluid along the path from the injection opening to the pressure sensor. This local speed of sound is pressure-dependent and temperature-dependent. Since a pressure wave propagates in the testing fluid starting from the injection opening and local energy is supplied to the measuring volume at the location of the injection opening, the temperature and pressure of the testing fluid are distributed within the measuring volume in an inhomogeneous manner and in particular are not constant along the path from the injection opening to the pressure sensor. In particular, the local speed of sound during an injection procedure is different than that prior to and after the injection. In an advantageous embodiment of the invention the correcting means are embodied so as to determine the average speed of sound $c_m$ along the path from the injection opening to the pressure sensor during at least one injection.

In order to determine the average speed of sound $c_m$, the correcting means can include, in a particularly advantageous embodiment of the invention, in particular a characterizing field which specifies the average speed of sound $c_m$ along the path from the injection opening to the pressure sensor as a function of the pressure p in the measuring volume in combination with a further variable. Said further variable can be the temperature T in the measuring volume. However, said temperature T can in turn be expressed by means of other variables. The temperature T is derived by way of example from the injection quantity m in conjunction with the temperature $T_{rail}$ and/or the pressure $p_{rail}$ of the fluid prior to entering the injection valve. Consequently, the characteristic diagram can specify the average speed of sound $c_m$ not only as a function of p and T, but by way of example also as a function of p, m and $T_{rail}$ or also as a function of p, m and $p_{rail}$. The functional correlation between the mentioned variables and the average speed of sound is in each case predetermined by means of the geometry of the measuring volume and by means of the material characteristics of the testing fluid. In a given device having a given measuring volume, the geometry of said device and volume is fixed. Testing fluids are produced in accordance with precise specifications with particularly narrow tolerances with the result that the material characteristics of the testing fluids can likewise be presumed as defined. In particular, the functional dependency of the density of such testing fluids is known from the pressure and the temperature. Therefore, for a given geometry of the measuring volume and a given testing fluid it is possible to calculate the characteristic diagram in advance and then said characteristic diagram is relevant for all measurements performed with this measuring volume in combination with this testing fluid.

The variables on which the average speed of sound $c_m$ depends in accordance with the characteristic diagram can be selected here in an advantageous manner according to the temporal resolution at which the respective variables are available. Since the injecting procedure is a dynamic procedure, the local speed of sound changes along the path from the injection opening to the pressure sensor not only with the location but also with the time. This can lead to the cause the measured, time-dependent injection rate $dm(t)/dt$ in relation to the propagation time correction at the start and end of the injection to include a different time shift according to the time-dependent average speed of sound $c_m(t)$ for the calculation of the real injection rate $dm'(t)/dt$.

In a particularly advantageous embodiment of the invention, an evaluating unit for filtering noise from the measured values of the pressure sensor is connected between the pressure sensor and the correcting means. Said evaluating unit can in particular include a low pass filter. A low pass filter of this type displaces the measured values on the time axis. In a further particularly advantageous embodiment of the invention the correcting means are therefore designed to partially compensate at least a time lag of the measured values of the pressure sensor, said time lag being caused by a filtering procedure. The level of this compensation can depend by way of example on the injection quantity m, on the temperature $T_{rail}$ prior to the fluid entering the injection valve or on the pressure $p_{rail}$ prior to the fluid entering the injection valve.

Advantageously, means for determining the hydraulic start of the injection $t'_{S,hydr}$ of the injection valve are additionally provided from the adjusted injection rate $dm'(t)/dt$. Said means can be designed by way of example to filter out noise from the values for the adjusted injection rate $dm'(t)/dt$ or to plot a compensating curve through scattered values of said adjusted injection rate $dm'(t)/dt$. In this manner, it is possible for the error when determining the start of the hydraulic injection $t_{S,hydr}$ to be reduced, said error being the measuring variable of most interest when characterizing injection valves.

Advantageously at least one ultrasonic sensor is additionally arranged in the measuring volume for the determination of the average speed of sound $c_{m,mess}$ in the testing fluid prior to and/or after the injection. Said ultrasonic sensor can be embodied in particular as a transmitter for sound waves and simultaneously also as a receiver for sound waves which are reflected at an opposite-lying wall of the measuring volume. Using the average speed of sound $c_{m,mess}$ it is possible to convert between the total injected mass of fluid and the change of pressure p which occurs as a result in the measuring volume. This correlation has the form of a balance equation.

Within the scope of the invention, a method for producing a device in accordance with the invention is also developed using a characteristic diagram. In the case of this method, the characteristic diagram is determined by means of a fluid dynamic simulation of the time-dependent and location-dependent local speed of sound $c(t,x)$ in a part volume of the measuring volume, said part volume comprising at least the path from the injection opening to the pressure sensor. Said simulation is based on at least one time-dependent boundary condition for the pressure p in the measuring volume and/or for the injection quantity m. It is possible from this simulation to determine the average speed of sound $c_m$ along this path by means of integration over all locations x along the path from the injection opening to the pressure sensor.

It has been identified that the outlay for determining the characteristic diagram for a geometry of the measuring volume in combination with a specific testing fluid is only incurred once. It is then possible to produce an arbitrarily large production run of devices in which the measuring volume comprises the same geometry. The characteristic diagram that is determined once can be integrated into all devices of this series in an identical form. Since the geometry of the measuring volume does not change in operation and also a refill of the testing fluid is available with characteristics that are always identical, in general during operation it is not necessary to re-calculate the characteristic diagram.

Advantageously, the part volume of the measuring volume, within which the time-dependent and location-dependent local speed of sound $c(t,x)$ is determined, reaches a wall of the measuring volume. The simulation then takes into account an at least partial reflection of the pressure wave at this wall, said pressure wave starting from the injection opening. In this manner, it is possible to take into account the fact that on the path from the injection opening to the pressure sensor the pressure wave which starts at the injection opening can interfere with one or multiple reflections of itself in a constructive and/or destructive manner.

In a further particularly advantageous embodiment of the invention, the simulation takes into account the presence and/or formation of cavitation in the testing fluid. By way of example, it is possible for cavitation bubbles or vapor bubbles to occur at specific sites along the flow path of a fluid fuel, in particular if the fuel is expanded again. When said fuel is injected into the measuring volume, local pressure fluctuations occur, wherein it is possible for further vapor bubbles to occur in the region of the local minimum pressure values. Furthermore, during the injection into the measuring volume local vortices occur that can generate further vapor bubbles in the path of the shear layer cavitation.

In a further particularly advantageous embodiment of the invention, the simulation takes into account a temperature dependency and/or a pressure dependency of the viscosity and/or the compression module of the testing fluid and/or the speed of sound in the testing fluid. These phenomena are the main causes of the average speed of sound $c_m$ along the path from the injection opening to the pressure sensor changing during the injection procedure with respect to the average speed of sound c in the testing fluid prior to and/or after the injection.

In accordance with the aforementioned, the invention also relates to a method for measuring the injection rate $dm(t)/dt$ of an injection valve for a fluid. $m(t)$ is the time-dependent injection quantity. The method is also based on a measuring volume that is enclosed on all sides and is filled with a testing fluid. The measuring volume comprises an opening in a wall of the measuring volume for receiving the injection valve with the result that in the installed position the injection valve protrudes into the measuring volume with at least one injection opening. Furthermore, a pressure sensor is arranged in the measuring volume. The pressure sensor is used to measure the temporal curve of the pressure in the measuring volume as a reaction to a time program $I(t)$ of the actuation of the injection valve.

In accordance with the invention, the propagation time of a pressure wave that starts at the injection opening and propagates through the testing fluid to the pressure sensor is determined using correcting means that are embodied for this purpose. The measured injection rate $dm(t)/dt$ is adjusted under the influence of this propagation time to an injection rate $dm'(t)/dt$.

All the disclosure provided for the device also expressly applies to the measuring method and vice versa.

BRIEF DESCRIPTION OF THE DRAWINGS

Further measures which improve the invention are further illustrated hereinunder together with the description of the preferred exemplary embodiments of the invention with reference to figures:

In the drawings:

FIGS. 2a-2b illustrate a measured injection rate dm(t)/dt on a time program I(t) of the electrical actuation of an injector, FIG. 4 illustrates an application example of the use of a device in accordance with the invention for optimizing the injection procedure in a diesel motor in the case of a pre-injection procedure that is performed prior to the main injection procedure.

DETAILED DESCRIPTION

Figure 1:
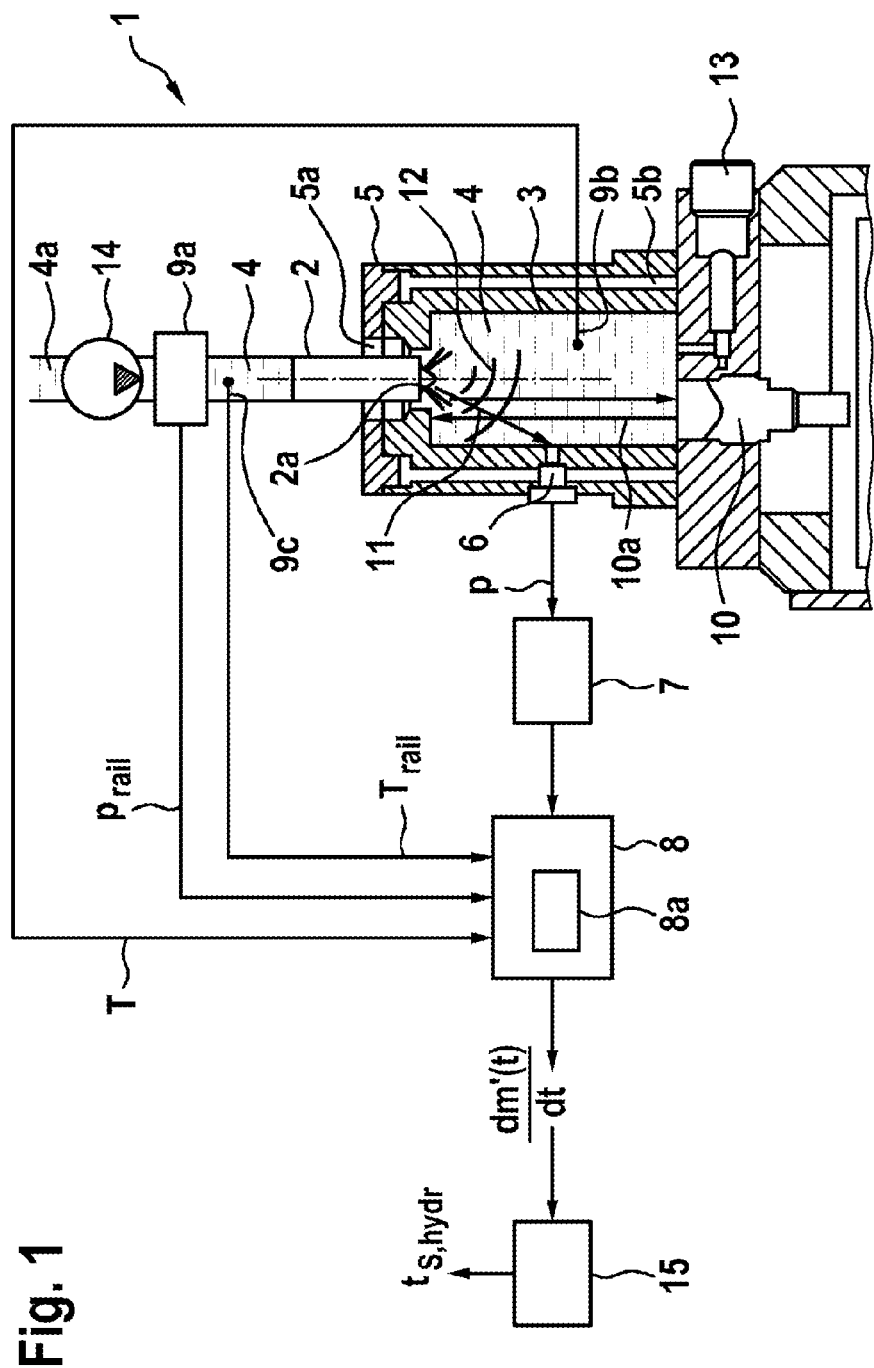
FIG. 1 illustrates an exemplary embodiment of the device in accordance with the invention.

FIG. 1 illustrates an exemplary embodiment of the device 1 in accordance with the invention. The measuring volume 3 is enclosed on all sides by a wall 5 which comprises cooling ducts 5b. The measuring volume 3 is filled with the testing fluid 4. The wall 5 of the measuring volume 3 comprises an opening 5a for receiving the injection valve 2 which is to be tested. The injection valve 2 is illustrated in the installed position in which said injection valve protrudes into the measuring volume 3 with an injection opening 2a. The injection valve 2 is supplied by way of a high pressure pump 14 with the fluid 4a which is to be injected. The fluid 4a is identical in this exemplary embodiment to the testing fluid 4.

A pressure sensor 6 is arranged in the measuring volume 3, said pressure sensor 6 transmitting the pressure p in the measuring volume 3 to an evaluating electronic system 7. The raw signal is initially amplified in the evaluating electronic system 7 and subsequently filtered using a low pass filter in order to eliminate noise. The filtered signal is passed on to the correcting unit 8.

The correcting unit 8 receives the following as additional input variables
- the pressure n rail of the fluid 4a prior to said fluid entering the injection valve 2, measured using a pressure sensor 9a,
- the temperature T in the measuring volume 3, measured using a temperature sensor 9b which is arranged in the measuring volume 3,
- and also the temperature $T_{rail}$ of the fluid 4a prior to entering the injection valve 2, measured using a further temperature sensor 9c.

The correcting unit 8 is designed to determine the propagation time of a pressure wave 12 which starts at the injection opening 2a and propagates through the testing fluid 4 to the pressure sensor 6. The correcting unit 8 comprises a characteristic diagram 8a for determining the average speed of sound $c_m$ along the path 11 from the injection opening 2a to the pressure sensor 6, said characteristic diagram 8a specifying the average speed of sound $c_m$ on the path 11 as a function of the pressures p and $p_{rail}$ and also the temperatures T and $T_{rail}$. The correcting unit 8 adjusts the measured, time-dependent injection rate dm(t)/dt under the influence of the propagation time and also under the influence of filter-dependent temporal shifts and passes the injection rate dm'(t)/dt which is adjusted in this manner on to a further evaluating unit 15 which determines the hydraulic start of injection $t_{S,hydr}$.

In addition, an ultrasonic sensor 10 is arranged in the measuring volume 3, said ultrasonic sensor transmitting sound waves along a path 10a, which is symbolized by means of arrows through the entire measuring volume 3, to the opposite-lying wall 5 and said ultrasonic sensor also receives the reflection again at this wall 5 on the same path 10a. The average speed of sound $c_{m,mess}$ in the testing fluid 4 is determined using said ultrasonic sensor 10 prior to and after the injection. The measuring volume 3 furthermore comprises a draining valve 13 which can be activated in an electromagnetic manner.

The measuring volume 3 is cylindrical with a height of 80 mm and a diameter of 45 mm. The pressure wave 12 has to travel from the injection opening 2a to the pressure sensor 6, therefore a distance of 46.3 mm. For an average temperature T, said temperature being assumed to be constant for simplicity, a speed of sound of c=1277 m/s is calculated in the measuring volume 3 and also diesel fuel or a testing oil which is used as a testing fluid to test diesel injection valves in the case of a basic pressure p in the measuring volume 3 prior to the injection of 50 bar. The pressure wave 12 then takes approximately 37 μs to travel along the path 11.

The characteristic diagram 8a which is stored in the correcting unit 8 is determined by means of a fluid dynamic simulation so that the correcting unit 8 can determine the propagation time in a more precise manner. For this purpose, a part volume of the measuring volume 3 is selected which is precisely as large as the measuring volume 3 and in the horizontal direction both the injection opening 2a as well as the pressure sensor 6 are entirely covered. Within said part volume, in addition to the local speed of sound c(t,x) the time-dependent and location-dependent distributions p(t,x) of the pressure in the measuring volume 3, T(t,x) of the temperature in the measuring volume 3, v(t,x) of the vectorial flow speed in the measuring volume 3 and also d(t,x) of the vapor proportion of the testing fluid 4 are calculated in the measuring volume 3. The driving force for the dynamics of said variables is the time program for the local pressure of the testing fluid 4, said time program being predetermined by means of the injection procedure at the location of the injection opening 2a. During the calculation, in addition to the geometry of the measuring volume 3, the pressure dependency and temperature dependency of viscosity, speed of sound and compression modulus of the testing fluid 4 were also taken into account. In addition to the injection opening 2a, the injection valve 2 comprises seven further injection openings. Since all eight injection openings are distributed in a rotationally symmetrical manner along the outer periphery of the injection valve 2, it is sufficient for the simulation to take only one injection opening 2a into account. The functioning of the invention is not bound to a specific number of injection openings; the disclosure of a number of 8 is consequently only understood as an illustration of the exemplary embodiment which is illustrated in the figure.

The simulation was implemented for 15 temperatures T in the region of 40° C. to 180° C. and also for 30 pressure $p_{rail}$ of 100 to 3000 bar. The temperature range of 40° C. to 180° C. represents the region in which the temperature T in the measuring volume 3 can vary in this exemplary embodiment. The characteristic diagram 8a in the correcting unit 8 therefore includes for the 450 different value pairs of pressure $p_{rail}$ and also temperature T in each case the associated average speed of sound $c_m$ ($p_{rail}$, T). Injection quantities m which correspond to a volume of fluid 4a in the range from 1 mm³ to 600 mm³ with an increment of 20 mm³ were taken into account. The temperature $T_{rail}$ of the fluid 4a is derived from $p_{rail}$ and T immediately prior to the injection into the measuring volume 3. The temperature $T_{inj}$ of the injected fluid 4a after it has entered the measuring volume 3 and has relaxed from the pressure $p_{rail}$ to the lower pressure p which prevails in the measuring volume 3 is thereby also determined. The temperature $T_{inj}$ and the injection quantity m (in the unit of mass) finally determine the energy input into the measuring volume 3 by means of the injection.

Since the part volume which is selected from the measuring volume 3 has been discretized to a fine enough extent in order also to be able to detect cavitation in the testing fluid 4, the simulation of a characteristic diagram point requires a computing time of approximately three weeks (6000 CPU hours) to a parallelized HPC system based on the Intel XEON architecture. The simulation was implemented using the program Ansys-CFX. The curves of the real injection rate dm'(t)/dt which are determined according to the evaluating method of the hydraulic pressure increase method from pressure curves at the pressure sensor 6 of the simulation were compared to measurements in order to verify the model.

The real injection rate dm'(t)/dt correlates with the variable V of the measuring volume 3, the pressure p and the temperature T in the measuring volume 3 and also the average speed of sound $c_m$ in the measuring volume 3 by means of $$\frac{dm'(t)}{dt} = \frac{d}{dt}\left(V \cdot \int_{P_1}^{P_2} \frac{1}{c_m^2(p,T)} dp\right)$$

wherein $p_1$ is the pressure p at the start of the injection and $p_2$ is the pressure p at the time t.

A time curve I(t) of the current with which an electromagnetically-controlled injection valve 2 (injector) is actuated is plotted in FIG. 2a over the time t. In FIG. 2b, the measured injection rate dm(t)/dt is plotted in arbitrary units over the same time scale. In this measurement, the correcting unit 8 was deactivated. The fact that the propagation time of the pressure wave 12 from the injection opening 2a to the pressure sensor 6 was consequently not taken into account has on the one hand the effect that the injection rate dm(t)/dt is offset on the time axis with respect to the time program I(t) of the current. On the other hand, some rapid changes in the current I(t) are generally not expressed in the measured injection rate dm(t)/dt since the local speed of sound c(t,x) in the testing fluid 4 depends upon the dynamic conditions in the measuring volume 3 and the dynamic conditions are in turn time-dependent. Moreover, further filter characteristics of the low pass filter in the evaluating electronic system 7 affect the position of the hydraulic start of injection in the rate signal. The measured injection rate dm(t)/dt is therefore derived from the real injection rate dm'(t)/dt as a result of the influence of the propagation time along the path 11 from the injection opening 2a to the pressure sensor 6, wherein the average speed of sound $c_m(t)$ is time-dependent along the path 11 and also the low pass filtering procedure has an influence on the measured propagation time. With the aid of the correcting unit 8 it is possible to at least partially invert both the influence of the propagation time with the time-dependent speed of sound as well as the influence of the low pass filtering procedure.

Figure 3A:
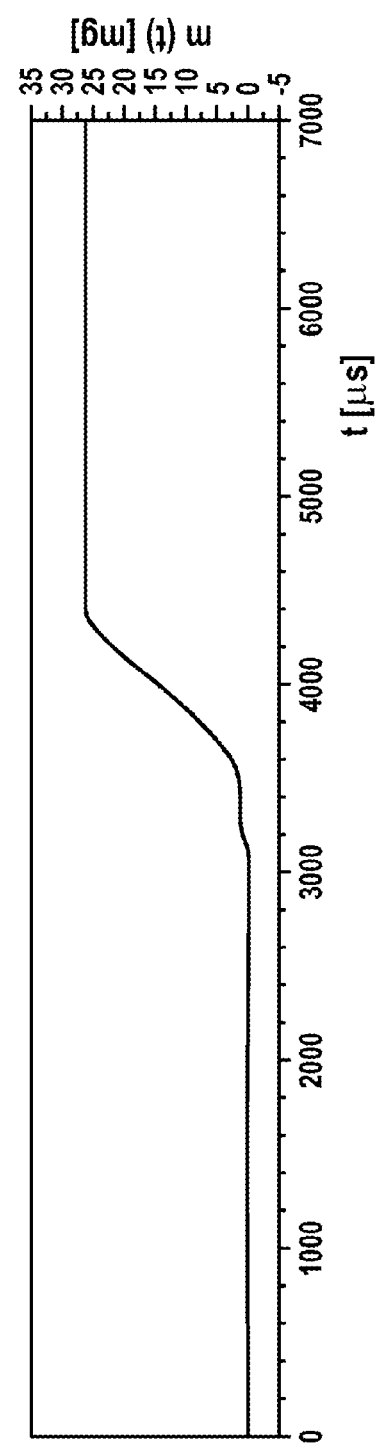
FIGS. 3a-3b illustrate improvement of the measuring accuracy when determining the injection rate dm(t)/dt, said improvement being achievable by means of the device in accordance with FIG. 1.
Figure 3B:
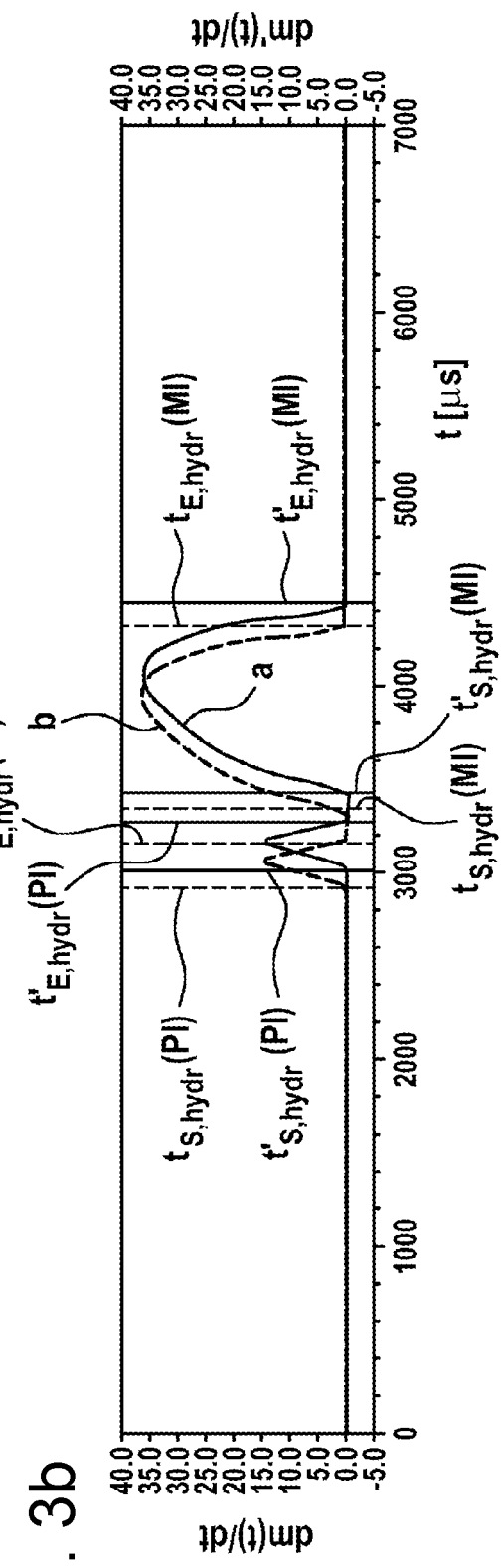

FIG. 3a illustrates the temporal curve of the additional mass m of fluid 4a which is introduced in total by means of an injection procedure into the measuring volume 3. FIG. 3b illustrates the temporal curve of the injection rates dm(t)/dt (left-hand scale) or dm'(t)/dt (right-hand scale) plotted over the same time scale. Curve a was recorded with a deactivated correcting unit 8 and specifies the measured injection rate dm(t)/dt. Curve b was recorded with an activated correcting unit 8 and specifies the adjusted injection rate dm'(t)/dt. The injection procedure comprises a small pre-injection PI and a subsequent essentially larger main injection MI.

It is possible to read the start and the end of the part injections PI and MI more precisely from the measured time curve of the injection rate dm(t)/dt. In accordance with curve a (with the correcting unit (8), the pre-injection PI starts at the point in time $t'_{S,hydr}$(PI) and ends at the point in time $t'_{E,hydr}$(PI). The main injection MI starts at the point in time $t'_{S,hydr}$(MI) and ends at the point in time $t'_{E,hydr}$(MI).

The comparison of the respective points in time shows that the correcting unit 8 does not just correct a constant offset of all time points along the time axis t. On the contrary, said correcting unit also takes into account a time-dependency $c_m(t)$ of the average speed of sound $c_m$ and also a filter bias as a result of the evaluating electronics system 7 and compensates said influences at least partially so that smearing and scattering of the injection pulse PI and MI are also corrected. This is possible to read in FIG. 3b by way of example from a comparison of the time interval between $t'_{S,hydr}$(PI) and $t_{S,hydr}$(PI) on the one hand and with the time interval between $t'_{E,hydr}$(PI) and $t_{E,hydr}$(PI) on the other. The last time interval is greater than the first. The difference is more clearly manifested if the time interval between $t'_{S,hydr}$(MI) and $t_{S,hydr}$(MI) on the one hand is compared with the time interval between $t'_{E,hydr}$(MI) and $t_{E,hydr}$(MI) on the other.

On the other hand, narrower injection pulses and shorter intervals between injection pulses can be triggered with the activated correcting unit 8. A single injection procedure can include up to ten part injections.

In the example illustrated in FIG. 3, the fluid 4a was supplied to the injection valve 2 at a pressure $p_{rail}$ of 800 bar. The injection valve 2 is electromagnetically activated for 220 µs so as to generate a pre-injection PI. The injection valve 2 was electromagnetically activated for 625 µs so as to generate the main injection MI.

FIG. 4 illustrates how the improved resolution that is demonstrated in FIG. 3 can be used to optimize the actuation of a diesel engine. The measured injection rate dm(t)/dt is plotted over the time t as in FIG. 3b. Curve a was measured with the deactivated correcting unit 8 and illustrates a hitherto conventional time program for the injection rate dm(t)/dt in which the pre-injection PI is performed prior to the main injection MI by 1800 µs. The curves b, c and d illustrate future time programs in which the pre-injection PI is performed prior to the main injection MI by a substantially shorter time period down to 200 µs (curve d) and said time programs can be more precisely ascertained using the correcting unit 8. It is advantageous with respect to the consumption characteristics and environmental characteristics of the diesel engine to move the pre-injection PI as close as possible to the main injection MI. The fluid 4a was supplied to the injection valve 2 at a pressure $p_{rail}$ of 800 bar. The injection valve 2 was in each case electromagnetically actuated so as to generate the pre-injection or PI' in each case for 220 µs. The injection valve 2 was electromagnetically actuated in each case for 625 µs for the main injection MI.

The invention claimed is:

1. A device for measuring the injection rate dm(t)/dt of an injection valve for a fluid, wherein m(t) is the injection quantity of the fluid, said injection quantity being dependent upon the time t, said device comprising: a measuring volume which is enclosed on all sides and k filled with a testing fluid, an opening in a wall of the measuring volume for receiving the injection valve with the result that in an installed position the injection valve protrudes with at least one injection opening into the measuring volume, and a pressure sensor which is arranged in the measuring volume, wherein correcting means are provided for determining the propagation time of a pressure wave which starts at the injection opening and propagates through the testing fluid to the pressure sensor and also to correct the measured injection rate dm(t)/dt to an adjusted injection rate dm'(t)/dt taking into account said propagation time, wherein the correcting means utilizing a characteristic diagram, and wherein the characteristic diagram is determined by means of a fluid dynamic simulation of the time-dependent and location-dependent local speed of sound c(t,x) in part volume of the measuring volume which comprises at least one path from the injection opening to the pressure sensor, said simulation being based on at least one time-dependent boundary condition for the pressure p in the measuring volume, for the infection quantity m, or for both.

2. The device as claimed in claim 1, wherein the correcting means are designed to determine the average speed of sound cm along the path from the injection opening to the pressure sensor during at least one injection procedure.

3. The device as claimed in claim 2, wherein the correcting means utilizes a characteristic diagram which specifies the avererage speed of sound cm along the path from the injection opening to the pressure sensor as a function of the pressure p in the measuring volume in combination with a. the temperature T in the measuring volume, b. the injection quantity m in conjunction with the temperature Trail, the pressure grail of the fluid prior to entering the injection valve or c. both a. and b.

4. The device as claimed in claim 1, wherein an evaluating unit for filtering noise from the measuring values of the pressure sensor is connected between the pressure sensor and the correcting means.

5. The device as claimed in claim 4, wherein the correcting means are designed to at least partially compensate a temporal shift of the measuring values of the pressure sensor, said temporal shift being caused by the filtering procedure.

6. The device as claimed in claim 1, wherein means for determining the hydraulic start of injection tS,h,dr of the injection valve from the adjusted injection rate dm'(t)/dt are provided.

7. The device according to claim 1, wherein in addition at least one ultrasonic sensor is arranged in the measuring volume so as to determine the average speed of sound cm, mess in the testing fluid prior to and/or after the injection procedure.

8. The device as claimed in claim 1, wherein the part volume of the measuring volume extends as far as a wall of the measuring volume and the simulation takes into account an at least partial reflection of the pressure wave at this wall, said pressure wave starting from the injection opening.

9. The device as claimed in claim 1, wherein the simulation takes into account the presence of cavitation in the test fluid, a formation of cavitation in the test fluid, or both.

10. The device as claimed in claim 1, wherein the simulation takes into account a temperature dependency of the viscosity of the testing fluid, a pressure dependency of the viscosity of the testing fluid, the compression module of the testing fluid, the speed of sound in the testing fluid, of a combination of the foregoing.

11. A method for measuring the injection rate dm(t)/dt of an injection valve for a fluid, wherein m(t) is the time-dependent injection quantity when using a measuring volume which is enclosed on all sides and is filled with a testing fluid, wherein said measuring volume comprises an opening in a wall for receiving the injection valve with the result that in the installed position the injection valve protrudes with at least one injection opening into the measuring volume, and a pressure sensor which is arranged in the measuring volume, wherein the temporal curve of the pressure in the measuring volume is measured using the pressure sensor as a reaction to a time program l(t) of the actuation of the injection valve, wherein the propagation time of a pressure wave which starts at the injection opening and propagates through the testing fluid to the pressure sensor is determined using correcting means, and in that the measured injection rate dm(t)/dt is adjusted under the influence of this propagation time to an injection rate dm'(t)/dt, and wherein the correcting means utilizes a characteristic diagram, and wherein the characteristic diagram is determined by means of a fluid dynamic simulation of the time-dependent and location-dependent local speed of sound c(t,x) in a part volume of the measuring volume which comprises at least one path from the injection opening to the pressure sensor, and simulation being based on at least one time-dependent boundary condition for the pressure p in the measuring volume, for the injection quantity m, or for both.

\* \* \* \* \*